US012421771B2

(12) United States Patent
Bendel

(10) Patent No.: US 12,421,771 B2
(45) Date of Patent: Sep. 23, 2025

(54) MOTOR VEHICLE LOCK

(71) Applicant: KIEKERT AKTIENGESELLSCHAFT, Heiligenhaus (DE)

(72) Inventor: Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 191 days.

(21) Appl. No.: 18/258,342

(22) PCT Filed: Dec. 10, 2021

(86) PCT No.: PCT/DE2021/100991

§ 371 (c)(1),
(2) Date: Jun. 20, 2023

(87) PCT Pub. No.: WO2022/152343

PCT Pub. Date: Jul. 21, 2022

(65) Prior Publication Data

US 2024/0035315 A1 Feb. 1, 2024

(30) Foreign Application Priority Data

Jan. 15, 2021 (DE) ..................... 10 2021 100 739.9

(51) Int. Cl.
*E05B 81/82* (2014.01)
*E05B 47/00* (2006.01)

(52) U.S. Cl.
CPC .............. *E05B 81/82* (2013.01); *E05B 47/00* (2013.01); *E05B 2047/0097* (2013.01)

(58) Field of Classification Search
CPC ... E05B 81/82; E05B 47/00; E05B 2047/0097
See application file for complete search history.

(56) References Cited

U.S. PATENT DOCUMENTS 10,378,251 B2 8/2019 Dente
2005/0035604 A1* 2/2005 Coleman ................ E05B 81/14 292/216
2015/0137531 A1* 5/2015 Papanikolaou ......... E05B 81/86 292/201

(Continued)

FOREIGN PATENT DOCUMENTS

DE 102015205345 A1 9/2016
DE 102018123264 A1 3/2020

(Continued)

OTHER PUBLICATIONS

International Search Report mailed Mar. 25, 2022, for priority International Application No. PCT/DE2021/100991.

*Primary Examiner* — Mark A Williams
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism arranged in a lock housing and made up substantially of a rotary latch and a pawl. Furthermore, an electromotive drive is provided, in particular for the locking mechanism and an emergency power source for emergency electrical power supply of the drive. According to the invention, the emergency power source is arranged in the lock housing in such a way that it can be replaced.

16 Claims, 2 Drawing Sheets

(56) References Cited

U.S. PATENT DOCUMENTS

| | | | | |
|---|---|---|---|---|
| 2015/0330117 | A1* | 11/2015 | Van Wiemeersch | B60R 21/00 292/96 |
| 2016/0130843 | A1* | 5/2016 | Bingle | E05B 81/82 292/201 |
| 2017/0058576 | A1 | 3/2017 | Faigle et al. | |
| 2017/0314302 | A1* | 11/2017 | Marlia | E05B 81/56 |
| 2018/0044949 | A1* | 2/2018 | Frello | E05B 81/04 |
| 2018/0340359 | A1* | 11/2018 | Cumbo | E05B 81/42 |
| 2022/0195761 | A1* | 6/2022 | Trescases | H02J 9/06 |

FOREIGN PATENT DOCUMENTS

| | | | |
|---|---|---|---|
| EP | 0694664 | A1 | 1/1996 |
| FR | 2775718 | A1 | 9/1999 |

* cited by examiner

MOTOR VEHICLE LOCK

This application is a national phase of International Patent Application No. PCT/DE2021/100991 filed Dec. 10, 2021, which claims priority to German Patent Application No. 10 2021 100 739.9 filed Jan. 15, 2021, each of which is hereby incorporated herein by reference in its entirety.

FIELD OF DISCLOSURE

The invention relates to a motor vehicle lock, in particular a motor vehicle door lock, having a locking mechanism which is arranged in a lock housing and is composed substantially of a rotary latch and a pawl, further comprising an electromotive drive, in particular for the locking mechanism, and with an emergency power source for emergency electrical power supply of the drive.

BACKGROUND OF DISCLOSURE

Motor vehicle locks and in particular motor vehicle door locks are nowadays increasingly equipped with electromotive drives, in particular for the locking mechanism. This can considerably increase comfort. In general, however, the electromotive drive in question can also be used and employed to realize functional positions such as locking positions, a child safety function, an anti-theft function, etc.

As a rule, the electromotive drive serves to electrically open the locking mechanism. Such an electrical opening process is not only particularly convenient, because this allows mechanical actuation by an operator to be discarded; instead, the operator for example actuates a switch, a door handle, a remote control, etc. to open the locking mechanism electrically. In principle, the electrical opening can also help improve the aerodynamics of an associated motor vehicle, because this allows, inter alia, outside door handles to be omitted.

In addition, such electromotive drives for the locking mechanism can also be used as a pull drive to pull the locking mechanism closed as described, for example, in the generic prior art according to DE 10 2018 123 264 A1. In the event of a drop in or failure of the body-side power supply to the electromotive drive, the emergency power source ensures that the electromotive drive is controlled via the emergency power source. As a result, the known motor vehicle lock should also be able to be opened in a structurally simple manner even in the event of an accident or crash.

A comparable motor vehicle lock is the subject of U.S. Pat. No. 10,378,251 B2. In this case as well, the aim is to be able to control any disruptions to the power supply to the electromotive drive in the event of an accident or crash. One conceivable solution is to provide a mechanical backup solution. However, such mechanical backup solutions are structurally complex and increase the weight of the motor vehicle lock. However, both an increase in weight and an increase in price are practically unacceptable (any longer) nowadays.

For this reason, the known teaching according to U.S. Pat. No. 10,378,251 B2 works with an emergency power source for the emergency electrical power supply of the drive. In the context of the known teaching, the emergency power source is one that makes use, inter alia, of so-called supercaps, i.e. capacitors with a particularly high capacitance, which are charged by the energy source provided as mandatory on the body side. For this purpose, inter alia an additional charging module is provided and, in addition, a so-called boost module in order to be able to provide the electrical voltage in the range of 9 V to 16 V typically required for operating the electromotive drive on the output side of the capacitor.

In U.S. Pat. No. 10,378,251 B2, the emergency power source is found inside the lock housing. In addition, a lock-side control unit additionally provided in the lock housing ensures that the emergency power source will be switched in an emergency. This has proven itself in principle.

However, the prior art still offers room for improvements. The supercapacitors used in the known teaching according to U.S. Pat. No. 10,378,251 B2 are expensive on the one hand and, on the other hand, require a specific charging module and the boost module already mentioned above. In addition, a so-called equalizer module is often implemented, which helps ensure that, in this example, the two supercapacitor cells used in the prior art have the same voltage during operation. Since the modules in question are arranged and have to be operated inside the lock housing together with the known emergency power source, this increases the design and financial outlay required to realize the known motor vehicle locks. The invention as a whole seeks to remedy this.

SUMMARY OF DISCLOSURE

The invention is based on the technical problem of further developing such a motor vehicle lock and in particular a motor vehicle door lock in such a way that, while the functionality of the emergency power source remains flawless, the design and monetary outlay is further reduced compared with the prior art.

To solve this technical problem, the invention proposes, in a generic motor vehicle lock and in particular a motor vehicle door lock, that the emergency power source is arranged in the lock housing in such a way that it can be replaced.

The invention therefore initially assumes that the emergency power source can be replaceably accommodated in the lock housing. In other words, this offers the further possibility of being able to rely on a conventional emergency energy source. Another advantage is that the emergency power source can in this way be designed to be self-sufficient from the body-side power source. In other words, the ability to replace the emergency power source inside the lock housing according to the invention opens up the possibility of being able to in principle dispense with an electrical connection to the body-side power supply, so that the emergency power source can therefore be designed to be self-sufficient and independent of the body-side power supply in question.

As a further consequence, it has proven to be particularly advantageous if the emergency power source is not designed to be chargeable. This design makes it possible in principle to dispense with a charging module along with the mandatory boost module according to the prior art according to U.S. Pat. No. 10,378,251 B2. Likewise, an equalizer module is dispensable. This is because the emergency power source, which is replaceably accommodated in the lock housing according to the invention, is designed to be self-sufficient and non-chargeable, and therefore provides from the outset the energy and associated voltage required for emergency operation for the electromotive drive.

The invention is based on the knowledge that such emergency power sources in the form of, for example, non-chargeable lithium batteries are nowadays available in large numbers, cheaply and without problems. In fact, such non-chargeable inorganic lithium batteries provide, for example, an output voltage of 3.6 V, so that three such batteries connected in series already generate a voltage of 10.8 V. Four such batteries even provide an output voltage of 14.4 V so that, in conjunction with the typically required current intensities of several amperes, the electromotive drive can be easily actuated in emergency operation and, for example, as before and without any changes, provides and can also ensure the electric opening of the barrier. It is even possible to very generally use so-called “button cells” in this context.

In this way, according to the invention, the replaceable emergency power source arranged in the lock housing can also be replaced and renewed by a layman if necessary. For this purpose, the design is usually such that the replaceable emergency power source is accessible via a lock mouth of the lock housing. The lock mouth in question typically serves to allow a body-side lock holder to interact with the locking mechanism inside the motor vehicle lock. Since the motor vehicle lock and in particular the motor vehicle door lock are generally mounted in the interior of an associated motor vehicle door, the lock mouth in question is generally accessible at least in the open state of the motor vehicle door in question.

If, for example, a cover to be opened or a replaceable insert is provided in the region of the lock mouth to accommodate the emergency power source, even a layman can replace the emergency power source. Furthermore, since the emergency power source within the scope of the invention is commonly available, and commercially available non-rechargeable batteries, complicated energy storage devices, charging modules, etc. are expressly unnecessary. As a result, not only the weight of the motor vehicle lock according to the invention but also its production price can be kept particularly low.

As a rule, a lock-side control unit is additionally provided in the lock housing. Mounting the lock-side control unit in the lock housing is associated with the advantage that the lock-side control unit is thereby mounted protected and, in particular in the event of a crash, is not damaged. As a result, the lock-side control unit in the lock housing can also control the substantial lock functions even after a crash and, in particular, can ensure that the electromotive drive can be energized with the aid of the emergency power source as before and without any changes. In addition, the emergency power source, which is also replaceable in the lock housing, can be checked with the aid of the lock-side control unit in the lock housing.

For example, it is conceivable that the lock-side control unit regularly checks the voltage provided by the emergency power source and also its charge state. As soon as the voltage or the charge state of the non-chargeable emergency power source has fallen below a certain threshold within the scope of the invention, the lock-side control unit can, for example, output a corresponding warning message to an additionally provided body-side control device or generally the motor vehicle, with the aid of which the operator or user is made aware that an exchange of the emergency power source is required.

As a rule, the lock-side control unit communicates with the previously mentioned body-side control unit. In this case, the communication is generally wired. Here, a bus connection has proven to be particularly convenient. In fact, by way of example and without limitation, it can be a so-called LIN bus (local interconnected network), i.e. a serial communication system, with the aid of which sensors and actuators inside the motor vehicle are usually networked together. In this case, the data transmission can take place as a PWM (pulse width modulated) signal. Of course, this is only by way of example and by no means mandatory. In any case, the lock-side control unit communicates with the body-side control device, advantageously via the mentioned bus connection. As a result, the body-side control unit can transmit an emergency signal to the lock-side control unit in an emergency. Of course, communication between the lock-side control unit and the body-side control device is also possible and provided for in normal cases.

The emergency signal in question is transmitted via the bus connection from the body-side control device to the lock-side control unit. As a rule, this takes place serially and by way of example as a PWM signal. As a rule, the emergency signal in turn corresponds to a voltage drop/voltage failure of the body-side power supply. I.e., as soon as the body-side control unit detects a significant voltage drop or even a complete voltage failure of the body-side power supply, the emergency signal in question is generated and is transmitted according to the invention to the lock-side control unit. Of course, an emergency signal typically results in additional measures and scenarios, for example for checking a crash sensor, possibly triggering belt tensioners, airbags, etc.

Furthermore, the design is advantageously such that the lock-side control unit switches at least its power supply and that of the electromotive drive to the emergency power source when the emergency signal is received. As a result, the lock-side control unit, together with the electromotive drive, is designed to be completely independent of the body-side power supply when the emergency signal is received. In most cases, the reception of the emergency signal by the lock-side control unit also ensures that an emergency sensor is optionally monitored.

This emergency sensor can be an additional sensor which is mounted on the outside or inside in or on the relevant motor vehicle door. In most cases, the emergency sensor in question is designed as an emergency switch. In addition, the emergency sensor in question may be specially identified in order to emphasize its importance. Given that the lock-side control unit monitors the emergency sensor in question only when the emergency signal is received, this ensures that any actuations of the emergency sensor outside the emergency operation by the lock-side control unit are ignored. Only during emergency operation and after receiving the emergency signal are actuations of the emergency sensor registered and implemented by the lock-side control unit.

As a result, an actuation of the emergency sensor in question in emergency operation by the lock-side control unit can be directly interpreted as meaning that an electrical emergency opening is desired in this example. In order to bring about this electrical emergency opening, the emergency power source is available which, in the emergency operation in question, ensures that the electromotive drive is nevertheless supplied with the electrical energy required for its actuation, independently of the body-side power supply. As a result, the electromotive drive can electrically open the lock in question in an emergency. Of course, other emergency actuations with the aid of the electromotive drive are also possible and conceivable.

In principle, the design is therefore such that, in the event of an emergency, the lock-side control unit switches to the emergency power source and monitors the emergency sensor. In general, the lock-side control unit can also switch the power supply of the entire motor vehicle lock to the emergency power source. This means that emergency actuations of the emergency sensor can be detected immediately with the aid of the lock-side control unit and converted, for example, into the desired electrical emergency opening.

Consequently, a motor vehicle lock and a method for its operation are explained, which corresponds to a significant simplification and a particularly cost-effective construction. In essence, this can be attributed to the fact that the emergency power source is replaceably arranged in the lock housing. Since, moreover, the emergency power source is designed to be self-sufficient and not chargeable, commercially available non-rechargeable batteries can be used in this context, which can even be replaced by a layman if necessary. Herein lie the essential advantages.

BRIEF DESCRIPTION OF DRAWINGS

The invention is explained in greater detail below with reference to a drawing which shows only one exemplary embodiment. In the drawing.

DETAILED DESCRIPTION

Figure 1:
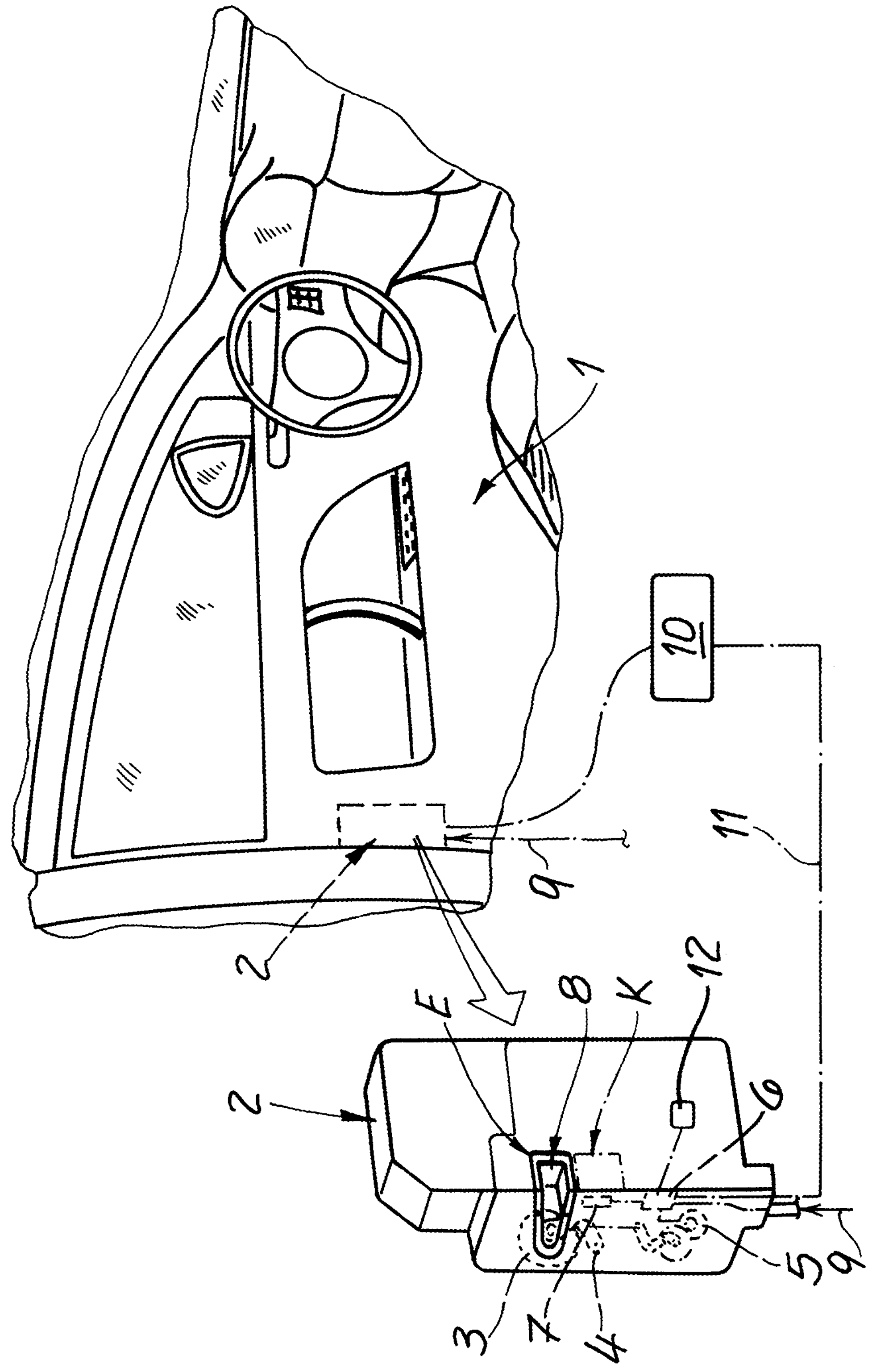
FIG. 1 shows a schematic overview of the motor vehicle lock according to the invention.

A motor vehicle lock is shown in the figures. The motor vehicle lock is a motor vehicle door lock which, according to the exemplary embodiment, is arranged inside a merely indicated motor vehicle door 1. In the exemplary embodiment, the motor vehicle door 1 is a motor vehicle side door, specifically a motor vehicle driver's door. In principle, however, the motor vehicle door 1 can also be a motor vehicle hatch, a motor vehicle tailgate, a motor vehicle fuel filler flap, etc. I.e., the term "motor vehicle door" 1 is to be interpreted broadly within the scope of the present invention.

In its basic design, the motor vehicle lock or motor vehicle door lock according to the illustration has a locking mechanism 3, 4 arranged in a lock housing 2. As is usual, the locking mechanism 3, 4 is composed of a catch 3 and a pawl 4. Within the scope of the illustration according to FIG. 1, a closed state of the locking mechanism 3, 4 is shown with the pawl 4 dropped into the rotary latch 3.

The basic structure of the motor vehicle lock also includes an electromotive drive 5 which, according to the exemplary embodiment, works on the pawl 4 and can lift it from its engagement with the rotary latch 3. As a result, the electromotive drive 5 is designed as an electromotive opening drive for the locking mechanism 3, 4 within the scope of the exemplary embodiment and without restriction.

The electromotive drive 5 is controlled by a lock-side control unit 6. The lock-side control unit 6 is located like the locking mechanism 3, 4 and the electromotive drive 5 in the interior of the lock housing 2. This also applies to an additionally provided emergency power source 7, with the aid of which the electromotive drive 5 can be energized for an emergency electrical power supply. The emergency power source 7 is likewise arranged and placed inside the lock housing 2.

According to the invention, the emergency power source 7 is replaceably arranged in the lock housing 2. In fact, the emergency power source 7 in question is accessible according to the exemplary embodiment and according to the illustration in FIG. 2 via a lock mouth 8. The lock mouth 8 can be seen especially in FIG. 2. In fact, the rotary latch 3 at least partially enters the lock mouth 8 in order to be able to interact with a latch holder (not expressly shown) located on a body of the motor vehicle when the motor vehicle door 1 is closed. For this purpose, the lock holder in question moves into the lock mouth 8. In addition, said lock mouth 8 is freely accessible as soon as the motor vehicle door 1 is open. This makes it possible to place an insert E in the lock mouth 8, which replaceably accommodates the emergency energy source 7 and can be replaceably inserted into the lock housing 2. At the same time, the insert E ensures that the lock housing 2 is closed.

Figure 2:
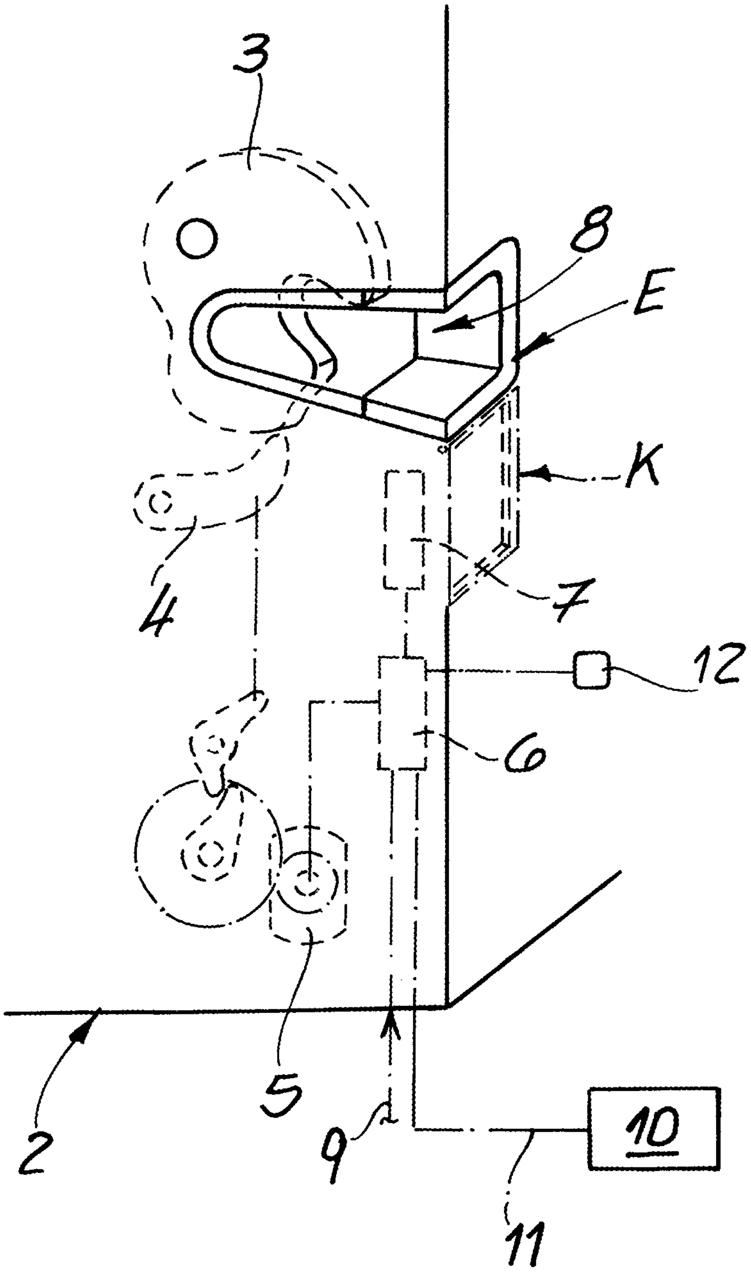
FIG. 2 shows a perspective detail view of the lock housing.

Instead of the insert E, however, an openable flap can also be provided and realized in the lock housing 2 in the region of the lock mouth 8, the opening of which makes the emergency power source 7 accessible. This flap K is indicated in FIGS. 1 and 2. Either way, the emergency power source 7 can be easily replaced by a layperson if necessary, which only requires the motor vehicle door 1 to be in the open state.

In the exemplary embodiment, the emergency power source 7 is one that is designed to be self-sufficient in comparison with a body-side power supply 9. In addition, the emergency power source 7 is not only designed to be self-sufficient or independent of the body-side power supply 9, but is also designed to be non-rechargeable. In this case, one or more non-rechargeable and commercially available lithium batteries have proven to be particularly advantageous as the emergency power source 7. These can even be present and designed in the form of button cells that are inserted into the replaceable insert E or in a holder which is accessible in the region of the lock mouth 8 when the alternatively provided flap K is opened.

The lock-side control unit 6 communicates with a body-side control device 10. A bus connection 11 is provided for this purpose. The bus connection 11 can be the LIN bus already mentioned in the introduction. As soon as the body-side control device 10 registers an emergency, the body-side control device 10 outputs an emergency signal to the lock-side control unit 6. As a rule, the emergency signal corresponds to a voltage drop/voltage failure of the body-side power supply 9.

As soon as the lock-side control unit 6 has received the emergency signal in question from the body-side control device 10, the lock-side control unit 6 switches its power supply and that of the electromotive drive 5 to the emergency power source 7. I.e., in normal operation, the lock-side control unit 6 is supplied with the required electrical energy along with the electromotive drive 5 with the aid of the body-side power supply 9. However, as soon as the emergency signal has been transmitted to the lock-side control unit 6 by the body-side control device 10, the power supply is switched over, namely from the body-side power supply 9 to the emergency power source 7. In this case, the emergency power source 7 may provide the entire electrical power supply for the motor vehicle lock, i.e. not only for the lock-side control unit 6 and the electromotive drive 5, but also and if necessary for the power supply of additional sensors, further motors, drives, etc. provided inside the motor vehicle lock. It is substantial, however, that the electrical power supply to the lock-side control unit 6 and the electromotive drive 5 is ensured with the aid of the emergency power source 7.

In this way, the lock-side control unit 6 automatically switches to the emergency power source 7 in the event of an emergency or when the emergency signal is received by the body-side control device 10. In addition, the design is such that in said emergency or when the emergency signal is received, the lock-side control unit 6 additionally monitors an emergency sensor 12. This emergency sensor 12 can be provided in the interior of the motor vehicle door 1, on the outside of the motor vehicle door 1 or also at another location. Since the emergency sensor 12 in question is monitored only and exclusively after receipt of the emergency signal from the lock-side control unit 6, any actuation of the emergency sensor 12 is ignored during normal operation.

Only in the event of an emergency and after receipt of the emergency signal does activation of the emergency sensor 12 cause the locking mechanism 3, 4 to be opened electrically in an emergency. This is because, in the event of an emergency, actuation of the relevant emergency sensor 12 is interpreted by the lock-side control unit 6 as meaning that the desired emergency opening of the lock 3, 4 is to be carried out. In principle, the emergency opening can be accompanied by a change in direction of rotation of the electromotive drive 5. However, this is not mandatory.

LIST OF REFERENCE SIGNS

1 Motor vehicle door
2 Lock housing
3, 4 Locking mechanism
3 Rotary latch
4 Pawl
5 Electromotive drive
6 Lock-side control unit
7 Emergency power source
8 Lock mouth
9 Body-side power supply
10 Body-side control device
11 Bus connection
12 Emergency sensor
K Flap
E Insert

The invention claimed is:

1. A motor vehicle lock comprising:

a lock housing, a locking mechanism which is arranged in the lock housing and includes a rotary latch and a pawl, an electromotive drive configured to work on the pawl of the locking mechanism to lift the pawl from engagement with the rotary latch to unlock the locking mechanism, a lock-side control unit arranged in the housing and configured to select a power supply for providing electrical power to the electromotive drive, wherein the lock-side control unit is electrically connected to a body-side power source for a body-side power supply, and an emergency power source, wherein the emergency power source is connected to the lock-side control unit and is electrically independent of the body-side power supply, wherein during normal operation the lock-side control unit is configured to provide power to the electromotive drive via the body-side power supply, wherein in the event of a voltage drop or voltage failure of the body-side power supply, the lock-side control unit is configured to switch to the emergency power source such that the emergency power source provides for an emergency electrical power supply of the electromotive drive, and wherein the emergency power source is removably arranged in the lock housing so as to be replaceable if necessary.

2. The motor vehicle lock according to claim 1, wherein the lock-side control unit is configured to monitor a voltage or charge state of the emergency power source.

3. The motor vehicle lock according to claim 2, further comprising a body-side control unit, wherein the lock-side control unit is configured to communicate with the body-side control unit.

4. The motor vehicle lock according to claim 3, wherein the body-side control unit is configured to transmit an emergency signal to the lock-side control unit in the event of the voltage drop or voltage failure of the body-side power supply.

5. The motor vehicle lock according to claim 4, wherein the emergency signal is transmitted serially as a pulse width modulated signal.

6. The motor vehicle lock according to claim 4, wherein the lock-side control unit is configured to switch the power supply of the electromotive drive to the emergency power source when the emergency signal is received.

7. The motor vehicle lock according to claim 6, wherein the lock-side control unit is configured to switch power supplies of an entirety of the motor vehicle lock to the emergency power source.

8. The motor vehicle lock according to claim 1, wherein the emergency power source is non-rechargeable.

9. The motor vehicle lock according to claim 1, wherein the emergency power source is accessible via a lock mouth in the lock housing that at least partially receives the rotary latch.

10. The motor vehicle lock according to claim 3, wherein the lock-side control unit is configured to communicate with the body-side control device via a bus connection.

11. The motor vehicle lock according to claim 6, further comprising an emergency sensor, and the lock-side control unit is configured to monitor the emergency sensor.

12. The motor vehicle lock according to claim 1, wherein the emergency power source includes a non-chargeable lithium battery.

13. The motor vehicle lock according to claim 1, wherein the emergency power source is removably arranged in the lock housing by arranging the emergency power source within a removable insert within the lock housing.

14. The motor vehicle lock according to claim 1, wherein the lock housing includes an openable flap for accessing the emergency power source for replacement.

15. The motor vehicle lock according to claim 2, wherein the lock-side control unit is configured to output a warning signal when the voltage or charge state of the emergency power source falls below a threshold.

16. The motor vehicle lock according to claim 11, wherein the emergency sensor is configured for actuation and lock-side control unit is configured to drive operation of the electromotive drive via the emergency power supply to lift the pawl from engagement with the rotary latch when the emergency signal is received and the emergency sensor is actuated.

* * * * *